Figure 1:
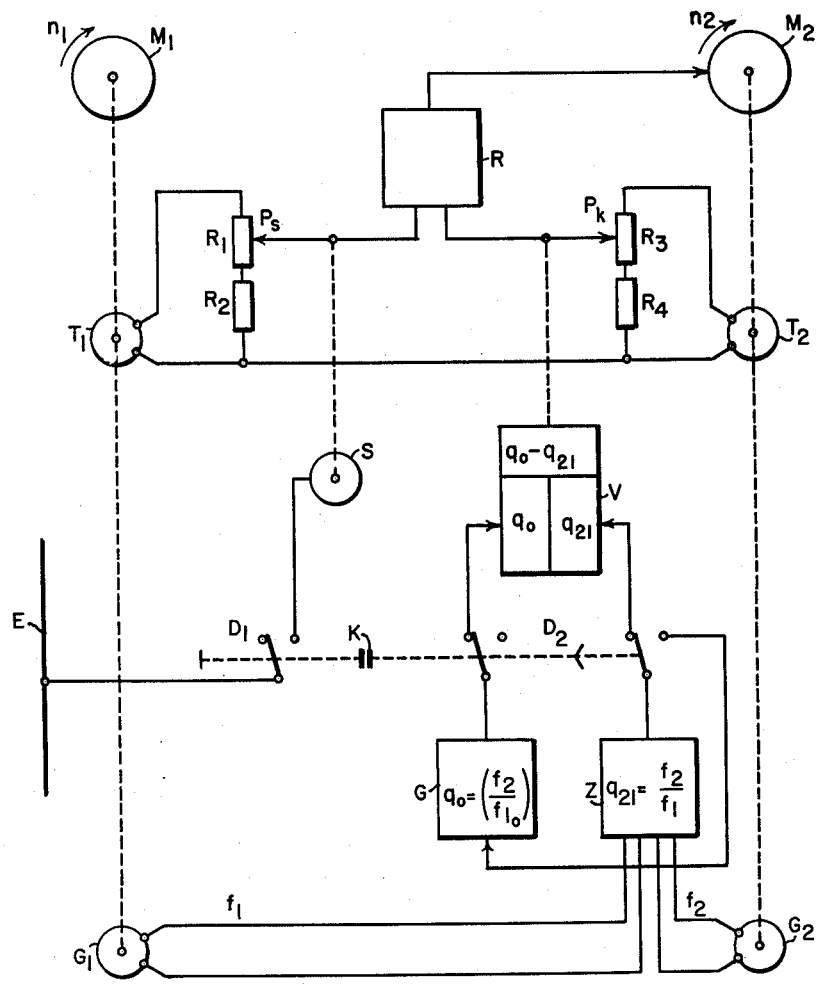

Jan. 14, 1964 P. HETTLER 3,118,097
SECTIONAL MOTOR DRIVE CONTROL
Filed Sept. 6, 1960 2 Sheets-Sheet 1

Fig. I.

WITNESSES:
Leon M. Garman
Laurence L. Lerner

INVENTOR
Peter Hettler
BY N.Y. Brodahl
ATTORNEY

United States Patent Office 3,118,097
Patented Jan. 14, 1964

3,118,097
SECTIONAL MOTOR DRIVE CONTROL
Peter Hettler, Erlangen, Germany, assignor to Siemens-Schuckertwerke Aktiengesellschaft, Erlangen, Germany, a corporation of Germany
Filed Sept. 6, 1960, Ser. No. 54,306
Claims priority, application Germany Sept. 11, 1959
5 Claims. (Cl. 318—70)

This invention relates to a system for maintaining constant speed or given speed ratios in multi-motor drives and is thus especially useful in such drives. More particularly it is a system for controlling the speed or speed ratio of multi-motor drives utilizing an analog and a digital speed measuring and control system where the digital control is superimposed upon the analog.

In this type of motor control system, it is necessary that the adjustment of the digital reference source be performed jointly with that of the analog reference source. In actual practice, this has entailed difficulties since a uniform distribution of the two references through the angle of adjustment could not be readily attained.

In accordance with this invention, this adverse feature has been eliminated by the use of a single reference value adjustment. The reference source is placed in the analog speed control system. Initially, while the analog speed control system is operating, the digital speed control system is disconnected from the control loop, and by switching the digital speed measuring device to a memory element which will store continuously the digitally measured actual value, a reference may be had for the time when the digital control system is switched back into the control loop. The last actual value stored in the memory and measured by the digital speed measuring device becomes available as the new reference value for the digital control when it is switched into the control loop.

It is the general object of this invention to avoid and overcome the foregoing and other difficulties of the prior art practices by the provision of a better and less expensive motor speed control system.

Another object is to provide a control system capable of maintaining constant speed or given speed ratios for two or more motors.

Another object is to provide a motor speed control system employing an analog speed control and a digital speed control superimposed thereon.

Another object of this invention is to provide a motor control system utilizing an analog sped control and a digital speed control system wherein only a single reference setter in the analog speed control system is necessary.

A further object is to provide a motor speed control system utilizing an analog and digital control, in which the digital control signal feeds into a memory unit while disconnected from the control loop during analog operation, and when re-inserted into the control loop utililzed the last measured value before re-insertion as reference, where this value is taken from the memory unit.

Another object of this invention is to provide a motor control system utilizing an analog and digital control system in which the digital control system is fed from two pulse transmitters responsive to the motor speed, wherein the pulses are received by a digital dividing device for placing the received speeds into predetermined ratio form.

The aforesaid objects of the invention and other objects which will become apparent as the description proceeds, are achieved by providing a system to maintain constant speeds or given speed ratios particularly for multi-motor drives comprising an analog speed measuring and control system having a reference value setter, a digital speed measuring and control system, memory means, switching means adapted to disconnect the digital system from the analog system whereby the analog reference value may be set while the digital system is connected to the memory means which records continuously the digitally computed actual value so that when the analog reference value is finally set, the actual digital value last to be measured by the digital system is recorded in the memory means and is available as a reference for the digital system when it is connected to the control loop.

Figure 2:
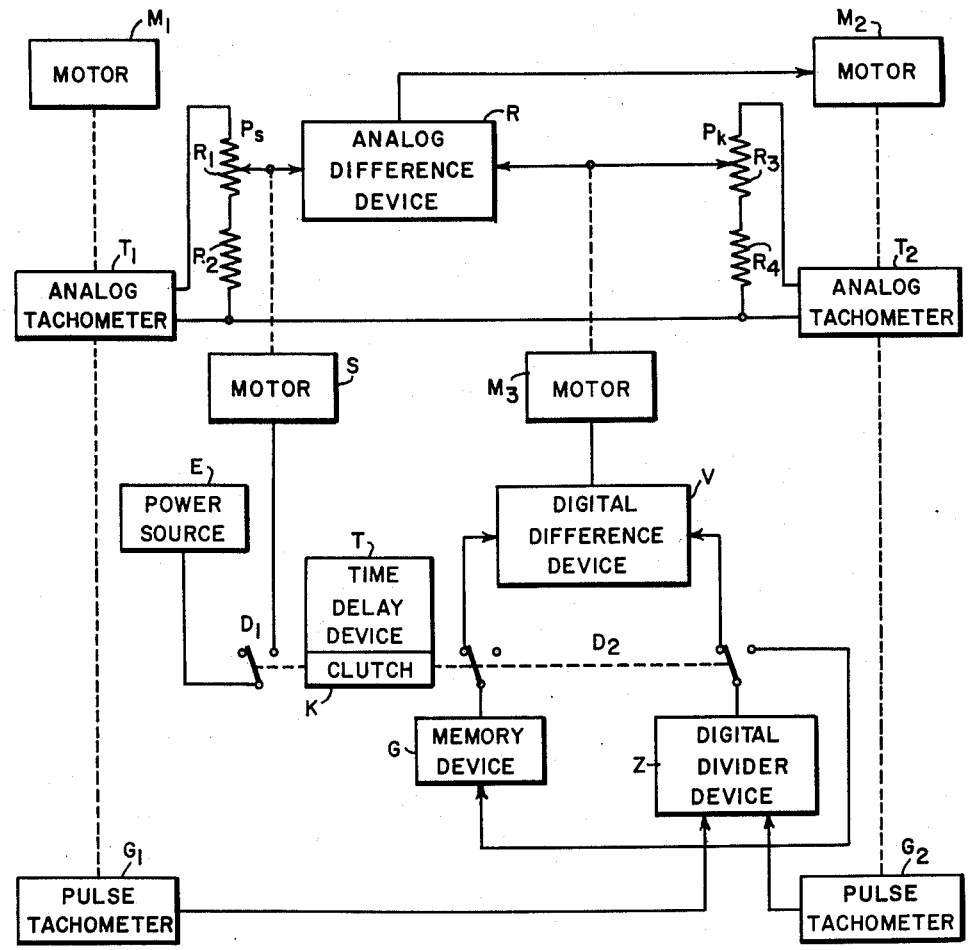

For a better understanding of the invention, reference should be had to the accompanying drawings wherein
FIG. 1 is a diagrammatic view of the invention;
FIG. 2 shows another diagrammatic view of the invention shown in FIG. 1.

The invention relates to a device for the control of one or more motor driven parts to maintain constant speeds or given speed ratios particularly for multi-motor drives employing analog or digital speed measuring and control system superimposed on the latter. It is proposed in this connection that a common reference value setter be employed for the adjustment of the references for both the analog and digital speed measuring and control system. The coupling of the digital reference source with the analog reference source creates problems in that it is necessary to obtain a uniform distribution of the two reference values over a predetermined range of adjustments. This requirement is particularly difficult to fulfill in those cases where pre-existent analog control loops are to be equipped subsequently with a digital control loop device. This invention has dispensed with the arrangement whereby it was necessary to obtain a uniform distribution of the characteristic of the digital reference value source with that of the reference value source of the analog system. Furthermore this arrangement makes it feasible to embody the invention in available control devices without any fundamental modification of the existing plan. This is achieved by setting the reference value with the aid of the reference value setter of the analog speed control device while the digital speed control system is disconnected from the control loop and by connecting the digital speed measuring device to a memory element while the reference value setting process is underway. The memory element records continuously the digitally determined actual value so that upon completion of the adjustment of the analog reference setter, the actual value which has been last measured and recorded in the memory now becomes available as a new reference value for the digital control. As a preliminary condition it is required that the speeds or speed ratios previously dictated by the reference setter of the analog control device be maintained constant with the aid of the analog control system long enough for the new reference value for the superimposed digital speed control system to be obtained with the aid of the digital measuring device from the new actual value. The time during which adjustment is made solely by means of the analog control system comes in practice to be no more than a few seconds.

Referring to FIGS. 1 and 2 there is shown two motors M1 and M2 which form part of a sectional motor drive, for example in a paper mill. The corresponding speeds of the motors are designated by references $n1$ and $n2$ and these are to be in relative synchronism with each other. Let us assume that motor M1 is the leading motor while motor M2 is the trailing motor. Each motor M1 and M2 is equipped with a tachometer generator T1 and T2 and a pulse or frequency transmitter G1 and G2. The outputs of the tachometer generators T1 and T2 and the pulse or frequency transmitters G1 and G2 are proportional to the speeds of their respective motors M1 and M2. The output of the tachometer generator T1 is fed to a reference value potentiometer $Ps$ formed of resistances R1 and R2. The output of tachometer generator T2 is fed to an actual value potentiometer $Pk$ formed of resistances R3 and R4. An analog difference device R measures the difference in voltage between reference potentiometer Ps and actual value potentiometer Pk. The output of the analog difference device R controls the motor M2. The analog difference device R may be any common difference amplifier well known in the art. In accordance with the type of design chosen, the rated value potentiometer Ps is adjusted by means of a regulating motor S which is energized accordingly by means of a power source E through a push button D1. The circuit must naturally be devised in such a manner that the reference value setter can be regulated in either direction. However, for the sake of greater simplicity, the drawings display the type of circuit that serves solely as a means of single direction adjustment. The pulse frequencies sent out by the pulse transmitter G1 and G2 are fed into a counter or digital divider Z, which is preferably devised as a branched line or double input device where the pulse frequencies are set into ratio. The counter may be an ordinary digital or binary dividing device well known in the art. The frequency ratio thus obtained, namely the ratio of $f_2/f_1$ is delivered in the course of operation as the actual value $q_{21}$ to a reference-actual value equalizer V, while the reference value for the reference-actual value equalizer V is taken from a memory element G. The reference value for the digital speed control is also formed with the aid of the counter Z. To this end a switching device D2 attached integrally to the push button or switching device D1 for the regulating motor S of the reference value potentiometer Ps is provided. The coupling of the switches D2 and D1 is shown diagrammatically by the coupling K. The switching device D2 has two contacts C1 and C2 and when the push button D1 is actuated for the purpose of setting a new reference value, these contacts are shifted into the right position thereby the counting device Z becomes connected with the memory unit G, while at the same time the contact between the memory unit G and the reference-actual value equalizer V is severed. This has the effect of disconnecting the digital speed control system from the control loop. The reference value is formed by virtue of the fact that the actual value is continuously measured with the aid of the counting device Z and recorded in the memory G. The push button D1 is released when the reference adjusting process has been accomplished. This instantly shuts off the reference motor S. The contacts of the switching device D2 however, do not return to their initial position but only do so after a given lapse of time due to the time delay device T. Any form of time delay, such as a butterfly value-controlled dashpot device, might be used which would allow the memory unit G to securely record the last adjustment of the counting unit Z. The last actual value is then made available as a new reference value to the digital reference actual value equalizer V, following the return of this switch D2 to the initial position, while thereafter, the continuous actual value is delivered directly by the counting device Z to the reference actual value equalizer V. The reference-actual value equalizer may be a well known digital difference device or something similar thereto. It is designed to deliver an initial value appropriate to exert an effect on the analog control circuit. The analog control circuit can be thus controlled in one of many ways, for instance, the digital reference value can be converted into an analog value and delivered directly to the reference-actual value equalizer R of the analog segments. The connection could also be established across the correction potentiometer Pk, as shown, with the aid of a step-by-step switch or a regulating motor M3 with a switching relay.

It can readily be seen by one skilled in the art that the objects of the invention have been achieved by the provision of a more simple and inexpensive motor control system utilizing analog and digital controls whereby the digital control could be used or added to a given analog control circuit. As was described the digital control utilizes the reference setting of the analog control by feeding in a changing actual value signal into a memory unit while the analog control is operating and the digital control is disconnected from the control loop. When the digital system is re-connected into the control loop, the memory device serves to provide a reference value signal for the digital control system, which reference value signal was the last measured value fed to the memory device before the switching of the digital control system into the control loop.

While a preferred embodiment of the present invention has been illustrated and described in detail, it is to be particularly understood that the invention is not limited thereto or thereby.

I claim as my invention:

1. In motor speed control apparatus operative with at least a first motor and a second motor for maintaining a predetermined speed relationship between said motors, the combination of analog signal providing means operative with said motors for providing first and second analog signals in accordance with the respective speeds of said motors, analog speed control means responsive to said first and second analog signals for controlling the speed of the second motor in accordance with the speed of the first motor, digital signal providing means operative with said motors for providing first and second digital signals in accordance with the respective speeds of said motors, digital speed control means responsive to said first and second digital signals for controlling the speed of the second motor in accordance with a predetermined relationship between said first and second digital signals, and control means responsive to a predetermined change in the operation of said analog speed control means for preventing the control of the second motor speed by said digital speed control means while said change is being made.

2. In motor speed control apparatus operative with at least a first motor and a second motor for maintaining a desired speed relationship between said motors, the combination of analog signal providing means operative with said motors for providing first and second analog signals in accordance with the respective speeds of said motors, analog speed control means responsive to said first and second analog signals for controlling the speed of the second motor in accordance with the speed of the first motor, said analog speed control means including an adjustable speed reference member operative with one of said analog signals, digital signal providing means operative with said motors for providing first and second digital signals in accordance with the respective speeds of said motors, digital speed control means responsive to said first and second digital signals and operative with said analog speed control means for controlling the speed of the second motor in accordance with a predetermined relationship between said first and second digital signals, and control means responsive to an adjustment of said speed reference member for preventing the control of the second motor speed by said digital speed control means when said change is being made.

3. In motor speed control apparatus operative with at least a first motor and a second motor for maintaining a predetermined speed relationship between said motors, the combination of analog signal providing means operative with said motors for providing first and second analog signals in accordance with the respective speeds of said motors, analog speed control means responsive to said first and second analog signals for controlling the speed of the second motor in accordance with the speed of the first motor, digital signal providing means operative with said motors for providing first and second digital signals in accordance with the respective speeds of said motors, digital speed control means responsive to said first and second digital signals for providing an output signal to control the speed of the second motor in accordance with a predetermined relationship between said first and second digital signals, a signal memory device operative with said digital speed control means, and control means responsive to a predetermined adjustment in the operation of said analog speed control means for supplying said output signal to said memory device while said adjustment is being made.

4. A speed control system to maintain a substantially constant speed relationship between at least a first motor and a second motor, comprising an analog speed control system including an adjustable analog speed reference setting device and being responsive to the respective speeds of said motors for controlling the speed of the second motor in accordance with the speed of the first motor, a digital speed control system including signal storage memory means operative as a digital speed reference setting device, said digital speed control system being responsive to the respective speeds of said motors and operative with said analog speed control system for providing an output signal to control said analog speed control system in accordance with a predetermined relationship between the respective speeds of said motors, and circuit switching means operative with said analog speed reference setting device and operative with said digital speed control system for supplying said output signal to said signal storage memory device while an adjustment of said analog speed reference setting device is made.

5. A speed control system to maintain a substantially constant speed relationship between at least a first motor and a second motor, comprising an analog speed control system including an adjustable analog speed reference setting device and being responsive to the respective speeds of said motors for controlling the speed of the second motor in accordance with the speed of the first motor, a digital speed control system including signal storage memory means, said digital speed control system including digital signal providing means for providing first and second digital signals responsive to the respective speeds of said motors and being operative with said analog speed control system for providing an output signal to control said analog speed control system in accordance with a predetermined ratio between said first and second digital signals, and circuit switching means operative with said analog speed reference setting device and operative with said digital speed control system for supplying said output signal to said signal storage memory device when an adjustment of said analog speed reference setting device is made.

References Cited in the file of this patent
UNITED STATES PATENTS 2,692,360    Wynn _____ Oct. 19, 1954